United States Patent Office

3,144,460
Patented Aug. 11, 1964

---

3,144,460
CERTAIN TRIAZOLYLUREAS
John F. Hosler and William B. Hardy, Bound Brook,
N.J., assignors to American Cyanamid Company, New
York, N.Y., a corporation of Maine
No Drawing. Filed Oct. 22, 1959, Ser. No. 847,892
3 Claims. (Cl. 260—308)

The present invention relates to new and useful triazolylurea compounds which conform to the general formula

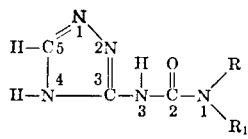

wherein R and $R_1$ represent hydrogen, an alkyl, alkenyl or an aryl radical. These new compounds are crystalline solids or oily liquids somewhat soluble in water and in many organic solvents. They exert a strong parasiticidal action against such organisms as fungi, bacteria, mites and insects and have utility as toxic constituents of spray and dust compositions for the control of household and agricultural insect pests such as aphids, beetles and roaches, and as active toxic constituents of compositions for the eradication of bacterial and fungus organisms.

The triazolylureas of this invention may be prepared by reacting 3-amino-1,2,4-triazole with aliphatic and aromatic isocyanates or carbamoyl halides, the reactions being illustrated by the following equations:

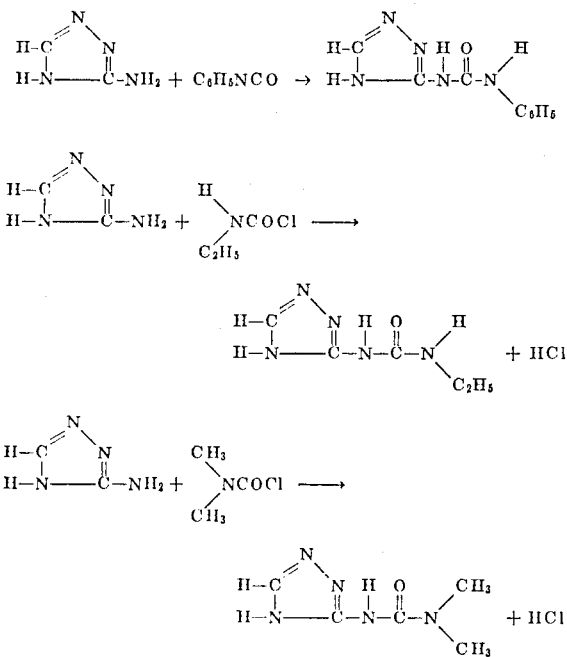

The above reactions take place smoothly at temperatures within the range of from about 20° to 100° C., and are carried out in an inert solvent such as acetone, benzene, toluene, xylene, diethyl ether or dioxane.

Isocyanates and carbamoyl halides typical of those capable of undergoing the above reactions include aliphatic isocyanates such as the methyl, ethyl, propyl, butyl, hexyl, 2-ethylhexyl, dodecyl, octadecyl, benzyl, allyl and ethynyl isocyanates; aryl isocyanates such as the phenyl, tolyl and xylyl isocyanates, the o, m and p-chorophenyl isocyanates, the o, m and p-nitrophenyl isocyanates, p-methoxyphenyl isocyanate, o-bromophenyl isocyanate, the α-naphthyl and β-naphthyl isocyanates; the mono-alkyl and mono-aryl carbamoyl halides such as the methyl, ethyl, butyl, hexyl, octyl, dodecyl, octadecyl, cyclohexyl, allyl, benzyl, phenyl, tolyl, xylyl and napthyl carbamoyl halides; the di-alkyl and di-aryl carbamoyl halides, such as the diethyl, dibutyl, dihexyl, dioctyl, didecyl, dioctadecyl, allyl, dibenzyl, diphenyl, ditolyl, dixylyl and dinaphthyl carbamoyl halides; and mixed carbamoyl chlorides such as the methyl ethyl, methyl propyl, ethyl propyl, ethyl butyl, butyl hexyl, methyl dodecyl, allyl butyl, ethyl phenyl and methyl α-naphthyl carbamoyl chlorides.

Particularly desirable triazolylureas, according to the present invention, are those prepared from the above reactants and conforming to the formula

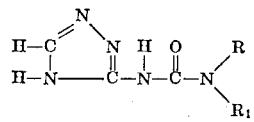

in which R is chosen from the group consisting of alkyl having from 1 to 18 carbon atoms; lower alkenyl; lower alkynyl; benzyl; phenyl; naphthyl; lower alkyl phenyl; lower alkyl naphthyl; cyclohexyl; and mono- substituted derivatives of phenyl in the above group, said substituents being selected from the group consisting of lower alkyl, halo-, nitro-, and lower alkoxy, and $R_1$ is a member chosen from the group consisting of H; alkyl having from 1 to 18 carbon atoms; lower alkenyl; benzyl; phenyl; naphthyl; and lower alkyl phenyl. However, when $R_1$ is a member of the group consisting of lower alkenyl, benzyl, phenyl, naphthyl and lower alkyl phenyl, R and $R_1$ are the same; and when $R_1$ is a member of the group consisting of H and lower alkyl ($C_1$–$C_{18}$), R is any member of the group above defining R.

These products, it has been discovered, are very well suited for the purposes of the present invention in that, as indicated above, they exert a strong parasiticidal action against such organisms as fungi, bacteria, mites and insects. Furthermore, the products of the instant invention have particular utility as toxic constituents of sprays and dust compositions for the control of household and agricultural insect pests, such as aphids, beetles and roaches, and as active toxic constituents of compositions for the eradication of bacterial and fungus organisms.

The invention will be described in greater detail in conjunction with the specific examples, the parts being by weight unless otherwise specified.

EXAMPLE I

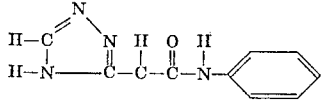

*1-Phenyl-3-(4H-1,2,4-Triazol-3-Yl)-Urea*

8.4 parts of 3-amino-1,2,4-triazole are suspended in 100 parts by volume of dry dioxane. 12 parts of phenyl isocyanate are added. The mixture becomes warm and a solution is obtained. The solution is heated to the boil, clarified by filtration and allowed to cool to room temperature. The precipitated product is isolated by filtration and dried. It melts at 160–161° C. An aqueous dispersion of the compound gives a 95% kill of the spores of *Sclerotinia fructigena* and *Macrosporium sarcinaeforme* at a concentration of 0.001%. Ureidotriazoles such as 3-ureido-5-methyl-1,2,4-triazole and 3-ureido-5-phenyl-1,2,4-triazole give no kill of the same spores at a concentration of 0.01%.

EXAMPLE II

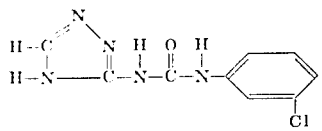

*1-m-Chlorophenyl-3-(4H-1,2,4-Triazol-3-Yl)-Urea*

8.4 parts of 3-amino-1,2,4-triazole are slurried in 200 parts by volume of acetone. 15.4 parts of m-chlorophenyl isocyanate are added. The mixture becomes very warm and a solution is obtained. On cooling to about 20° C., the product precipitates and is filtered off and dried. It melts at 156–157° C.

EXAMPLE III

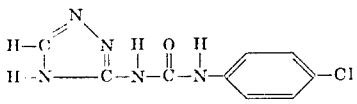

*1-p-Chlorophenyl-3-(4H-1,2,4-Triazol-3-Yl)-Urea*

8.4 parts of 3-amino-1,2,4-triazole are suspended in 50 parts by volume of dry dioxane. 15.4 parts of p-chlorophenyl isocyanate are added. The reaction is exothermic, and the resulting solution is then cooled to room temperature. The white crystalline product is filtered off and recrystallized from ethanol. An aqueous dispersion of the compound gives a 100 percent kill of the spores of *Macrosporium sarcinaeforme* at a concentration of 0.001 percent.

EXAMPLE IV

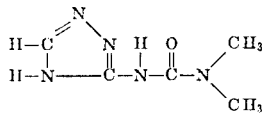

*1,1-Dimethyl-3-(4H-1,2,4-Triazol-3-Yl)-Urea*

A mixture of 8.4 parts of 3-amino-1,2,4-triazole, 10.7 parts of dimethylcarbamoyl chloride and 12 parts of sodium bicarbonate in 100 parts by volume of benzene is heated at reflux with stirring until the reaction is complete. The sodium bicarbonate serves as an acceptor for by-product hydrogen chloride. The warm reaction mixture is filtered, and the filtrate is cooled to room temperature. The precipitated product is filtered off, dried and recrystallized from ethanol. It melts at 142–144° C. The compound gives a 90 percent kill of black been aphids at a concentration of 0.1 percent in a solvent carrier consisting of 65 percent acetone and 35 percent water. A ureidotriazole such as 3-ureido-5-phenyl-1,2,4-triazole gives no aphid kill at the same concentration.

EXAMPLE V

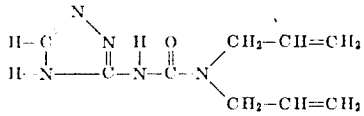

*1,1-Diallyl-3-(4H-1,2,4-Triazol-3-Yl)-Urea*

The procedure of Example IV is followed except that 15.9 parts of diallylcarbamoyl chloride are used in place of the 10.7 parts of dimethylcarbamoyl chloride.

EXAMPLE VI

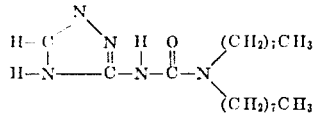

*1,1-Di-n-Octyl-3-(4H-1,2,4-Triazol-3-Yl)-Urea*

The procedure of Example IV is followed except that 30.3 parts of di-n-octylcarbamoyl chloride are used in place of the 10.7 parts of dimethylcarbamoyl chloride.

EXAMPLE VII

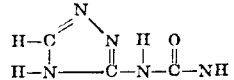

*3-(4H-1,2,4-Triazol-3-Yl)-Urea*

A solution of 16.8 parts of 3-amino-1,2,4-triazole in 100 parts of water and 100 parts of acetic acid is mixed with a solution of 32.4 parts of potassium isocyanate in 100 parts of water. After standing at room temperature for 72 hours, the precipitated white crystalline product is filtered off, washed with water and dried. It melts at approximately 200° C., and immediately resolidifies.

EXAMPLE VIII

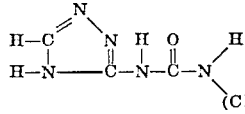

*1-n-Butyl-3-(4H-1,2,4-Triazol-3-Yl)-Urea*

16.8 parts of 3-amino-1,2,4-triazole are suspended in 150 parts by volume of dry dioxane. 20 parts of n-butyl isocyanate are added. The reaction mixture is heated on a steam bath for 20 hours. On cooling to room temperature, the product precipitates and is filtered off and dried. It melts at 106–107.5° C.

EXAMPLE IX

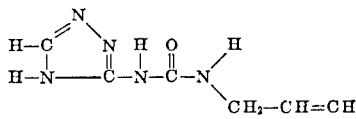

*1-Allyl-3-(4H-1,2,4-Triazol-3-Yl)-Urea*

The procedure of Example VIII is followed except that 16.6 parts of allyl isocyanate are used in place of the 20 parts of n-butyl isocyanate.

EXAMPLE X

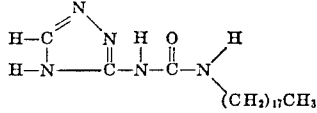

*1-n-Octadecyl-3-(4H-1,2,4-Triazol-3-Yl)-Urea*

The procedure of Example VIII is followed except that 60 parts of n-octadecyl isocyanate are used in place of the 20 parts of n-butyl isocyanate.

EXAMPLE XI

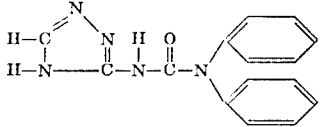

*1,1-Diphenyl-3-(4H-1,2,4-Triazol-3-Yl)-Urea*

A mixture of 8.4 parts of 3-amino-1,2,4-triazole, 23.2 parts of diphenylcarbamoyl chloride and 12 parts of sodium bicarbonate in 150 parts by volume of dioxane is heated under reflux at about 90° C. for a period of 20 hours. The warm reaction mixture is filtered, and the filtrate is cooled to room temperature (20° C.). The precipitated white crystalline product is filtered off, washed with water, and dried at 50° C.

In the control of organisms such as fungi, bacteria, mites and insects, the triazolyureas of this invention may be applied as dry powders usually in mixture with inert carriers such as talc, bentonite, pumice, fuller's earth and the like. They may also be applied in the form of a spray in solution or suspension in a liquid carrier. When the liquid carrier is water, it is an advantage to use in the composition wetting agents and/or emulsifying agents such as sulfates of long chain alcohols containing from 12 to 18 carbon atoms, sulfonated amide and ester derivatives, sulfonated aromatic and mixed alkyl-aryl sulfonated derivatives, esters of fatty acids such as the ricinoleic acid ester of sorbitol, petroleum sulfonates of $C_{10}$ to $C_{20}$ chain length, and the like. Other liquid carriers which are particularly suitable for the compounds of this invention include the perhalogenated solvents such as trichlorofluoromethane, dichlorodifluoromethane, chlorotrifluoromethane, and other Aerosol type solvents.

The compounds of the present invention may be readily mixed with other active ingredients such as other fungicides or insecticides, herbicides, hormones, fertilizers, and the like to produce multi-purpose compositions. Such mixtures may be either powder or liquid compositions. The other active ingredients may serve as the carrier or an inert carrier may be employed. Examples of such added active ingredients are arsenates, fluorides, rotenones, di(p-chlorophenyl)-trichloroethane, benzene hexachloride and the like.

While the invention has been described with particular reference to specific embodiments, it is to be understood that it is not to be limited thereto but is to be construed broadly and restricted solely by the scope of the appended claims.

The present application is a continuation-in-part of U.S. Serial No. 655,186, filed April 26, 1957, and now abandoned.

We claim:
1. 1-phenyl-3-(4H-1,2,4-triazol-3-yl)-urea.
2. 1,1-dimethyl-3-(4H-1,2,4-triazol-3-yl)-urea.
3. 1-p-chlorophenyl-3-(4H-1,2,4-triazol-3-yl)-urea.

References Cited in the file of this patent

UNITED STATES PATENTS

| | | |
|---|---|---|
| 2,399,598 | Kaiser | Apr. 30, 1956 |
| 2,762,743 | Basso et al. | Sept. 11, 1956 |

FOREIGN PATENTS

| | | |
|---|---|---|
| 824,541 | Great Britain | Dec. 2, 1959 |

OTHER REFERENCES

Bulow: Beilstein (Handbuch, 4th ed.), vol. 26, page 19 (1937).

Ainsworth et al.: Chem. Abstracts, vol. 48, col. 12740 (1954).

UNITED STATES PATENT OFFICE
CERTIFICATE OF CORRECTION

Patent No. 3,144,460                            August 11, 1964

John F. Hosler et al.

It is hereby certified that error appears in the above numbered patent requiring correction and that the said Letters Patent should read as corrected below.

Column 2, lines 52 to 57, the formula should appear as shown below instead of as in the patent:

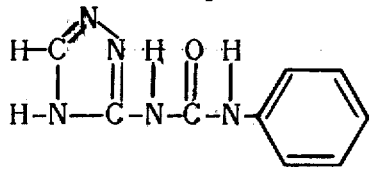

Signed and sealed this 9th day of March 1965.

(SEAL)
Attest:

ERNEST W. SWIDER                           EDWARD J. BRENNER
Attesting Officer                              Commissioner of Patents